(No Model.)
H. B. MARTIN.
ADDING MACHINE.
No. 529,799. Patented Nov. 27, 1894.
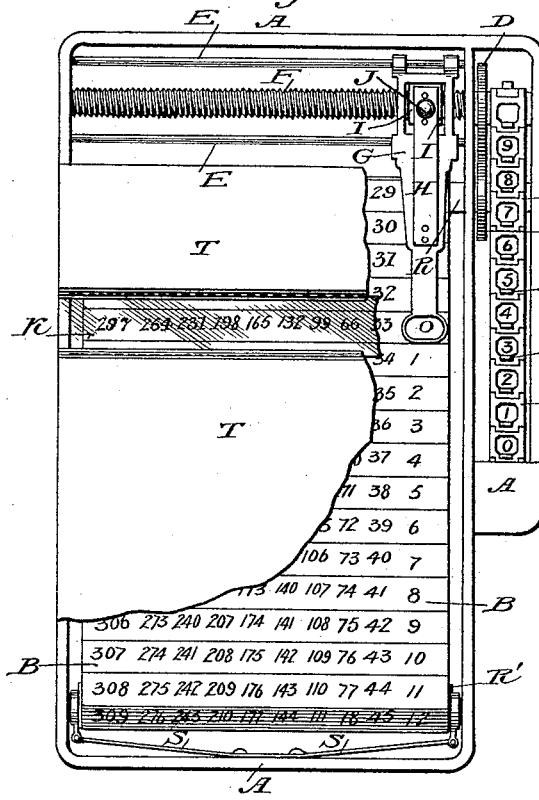
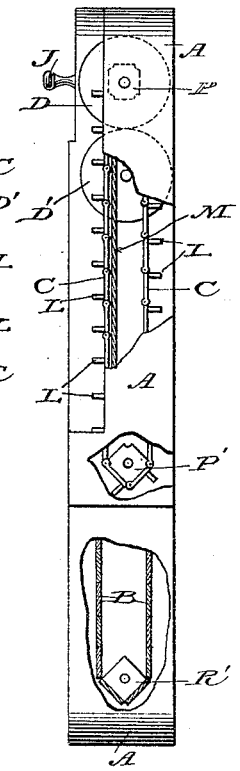
Witnesses.
J. H. Lee
J. Sims
Inventor.
Horace B. Martin

UNITED STATES PATENT OFFICE.

HORACE B. MARTIN, OF CHINO, CALIFORNIA.

ADDING-MACHINE.

SPECIFICATION forming part of Letters Patent No. 529,799, dated November 27, 1894.

Application filed December 4, 1893. Serial No. 492,678. (No model.)

*To all whom it may concern:*

Be it known that I, HORACE B. MARTIN, a citizen of the United States, residing at Chino, in the county of San Bernardino and State of California, have invented a new and useful Improvement in Adding-Machines, of which the following is a specification.

The object of my invention is to produce a machine specially suited to adding single rows of figures and constructed with a view to combine accuracy, simplicity, and convenience of manipulation, conforming as nearly as possible to the mental method; and to accomplish which I employ the device represented in the accompanying drawings forming a part of this specification, in which—

Figure 1 is a plan with a portion of the cover broken away, showing the parts in proper position and Fig. 2 is a side elevation of the same with portions of the frame removed to disclose the movement.

A, represents the frame, inclosing all the other parts; B, an endless belt constructed of thin flexible muslin, on which are pasted an uneven number of strips of thin, firm bristol board or drawing paper of a width to correspond with the faces of two square rollers over which it runs. On these strips, before cut, numbers are printed, running consecutively from zero (0) to the highest number expressing the limit of the machine, set at such an incline in rows that when the ends of the belt are joined, they shall represent a continuous helical column. The numerals, beginning at 0 to 1 as shown in Fig. 1 run to 12 inclusive on the front face, then from 13 to 28 inclusive on the rear face, then from 29 to 45 inclusive on the front face and so on to the desired limit.

C, is a chain of an uneven number of open links, not less than twenty-five in number, to give motion to the belt through gears D and D', running on sprockets P and P'.

D D' are two cog wheels of even diameter engaging with each other, shown as friction wheels from which all motion is imparted. E E, two rods to act as guides to a crosshead G; F, a screw to give lateral motion to an index O and on the end of which screw the wheel D is keyed.

G is a crosshead provided with four drilled lugs to slide on the rods E E with an opening permitting a half nut I to pass through it and rest on the screw F, to which is attached a spring H, and is also provided with an arm projecting down and terminating with an index O as shown.

H is a spring attached at one end to the crosshead G and at the other to a half nut I.

I is a half nut pressed by the spring H to the screw F.

J is a stud by which the half nut is raised from contact with the screw in returning the crosshead to position.

K is a strip of glass with end broken away set in a slot in the cover T, through which the results are disclosed.

L L are lugs or vertical projections on the chain C.

M is a stationary plate made fast to the frame shown in Fig. 2 on which the chain C slides, and is stamped with the index figures 9, 8, 7, 6, 5, 4, 3, 2, 1, 0.

P P' are square pulleys with corners cut away for carrying the chain C, for which sprockets may be substituted.

R R' are square rollers for carrying the belt B.

S is a thin spring terminating in link bearings for the lower roller to preserve proper tension on the belt.

The machine is to be adjusted to show the index inclosing 0, and as the column is added is moved along by the side of the column of figures. The operator, placing a pencil or stylus on the figures as shown in the copy, pulls each down until stopped by the cover, the chain passing freely under the same. This imparts motion to the wheel D, thence to wheel D' which is keyed on the driving roller shaft R, reversing the direction, carrying the belt as many spaces as there are links moved while the screw F carries the crosshead to the left, keeping the index on the helical line of figures on the belt. When the total is reached the unit figure of the result is entered at the foot of the column and the index set to the remaining figure or figures, when the process is repeated.

I am aware that the endless belt as constructed is not new in a mathematical machine, having been previously patented to me in another combination. I therefore do not claim novelty in the same, but What I do claim as new, and desire to secure by Letters Patent, is—

The combination in an adding machine with a supporting frame provided with a semiflexible endless belt containing a table of consecutive numbers helically arranged of a driving chain C, with sprockets P, P' to carry the same; the transverse screw F to give lateral motion, the index O,—and the gears D D' to transmit motion to the belt and index—substantially as shown.

HORACE B. MARTIN.

Witnesses:
A. D. FRAZER,
J. H. LEE.